(12) United States Patent
May

(10) Patent No.: US 8,016,462 B2
(45) Date of Patent: Sep. 13, 2011

(54) MOTORCYCLE ADJUSTABLE LIGHT BAR ASSEMBLY

(75) Inventor: Darron B. May, Stillwater, MN (US)

(73) Assignee: Kuryakyn Holdings, LLC, Somerset, WI (US)

( * ) Notice: Subject to any disclaimer, the term of this patent is extended or adjusted under 35 U.S.C. 154(b) by 232 days.

(21) Appl. No.: 12/322,378

(22) Filed: Feb. 2, 2009

(65) Prior Publication Data

US 2010/0195339 A1 Aug. 5, 2010

(51) Int. Cl.
*B62J 6/00* (2006.01)

(52) U.S. Cl. ............... 362/473; 362/549; 362/217.16; 362/217.17

(58) Field of Classification Search .......... 362/473–476, 362/549, 217.14, 217.16, 217.17, 249.01, 362/406
See application file for complete search history.

(56) References Cited

U.S. PATENT DOCUMENTS

| | | | | |
|---|---|---|---|---|
| 4,807,919 | A * | 2/1989 | Ito | 296/37.1 |
| 5,872,510 | A * | 2/1999 | O'Shaughnessy | 340/468 |
| 6,820,756 | B2 * | 11/2004 | Garza | 211/87.01 |
| 7,419,284 | B2 * | 9/2008 | Thiers et al. | 362/473 |
| 7,500,770 | B2 * | 3/2009 | Medina | 362/473 |
| 7,571,787 | B2 * | 8/2009 | Saiki | 180/210 |
| 7,585,095 | B1 * | 9/2009 | Sheriff | 362/473 |
| 2006/0062003 | A1 * | 3/2006 | Lee | 362/475 |

OTHER PUBLICATIONS

2007 Kuryakyn Catalog for Accessories for Goldwing & Metric (2 pages).
2007 Kuryakyn Catalog for Accessories for Harley (3 pages).

* cited by examiner

*Primary Examiner* — Robert May
*Assistant Examiner* — Leah S Lovell
(74) *Attorney, Agent, or Firm* — Dicke, Billig & Czaja, PLLC

(57) ABSTRACT

A motorcycle light bar assembly has two light bar arms that are mountable to a mounting bracket secured on a structural member of the front fork of the motorcycle. Each of the two light bar arms is a mirror image of the other and includes a first portion that extends along an axis in an X direction and a second portion the curves off axis in a Y direction. The first portion of each of the light bar arms is mountable to the mounting bracket. A lighting component is connectable to a free end of each of the second portions of the two light bar arms. Mounted to the mounting bracket in a first configuration the free ends of the two light bar arms are positioned forward of the axis of the respective first portions. Mounted to the mounting bracket in a second configuration, the free ends of the two light bar arms are positioned rearward of the axis of the respective first portions. In both the first and second mounting configurations, mounting of the light bar arms to the mounting brackets is adjustable to vary a width of the light bar assembly defined by the free ends of the two light bar arms. A cover is mountable to the two light bar arms to hide the mounting bracket and first arm portions when they are in any of the aforementioned mounting configurations so as to give the light bar assembly the appearance of being a unitary light bar.

4 Claims, 7 Drawing Sheets

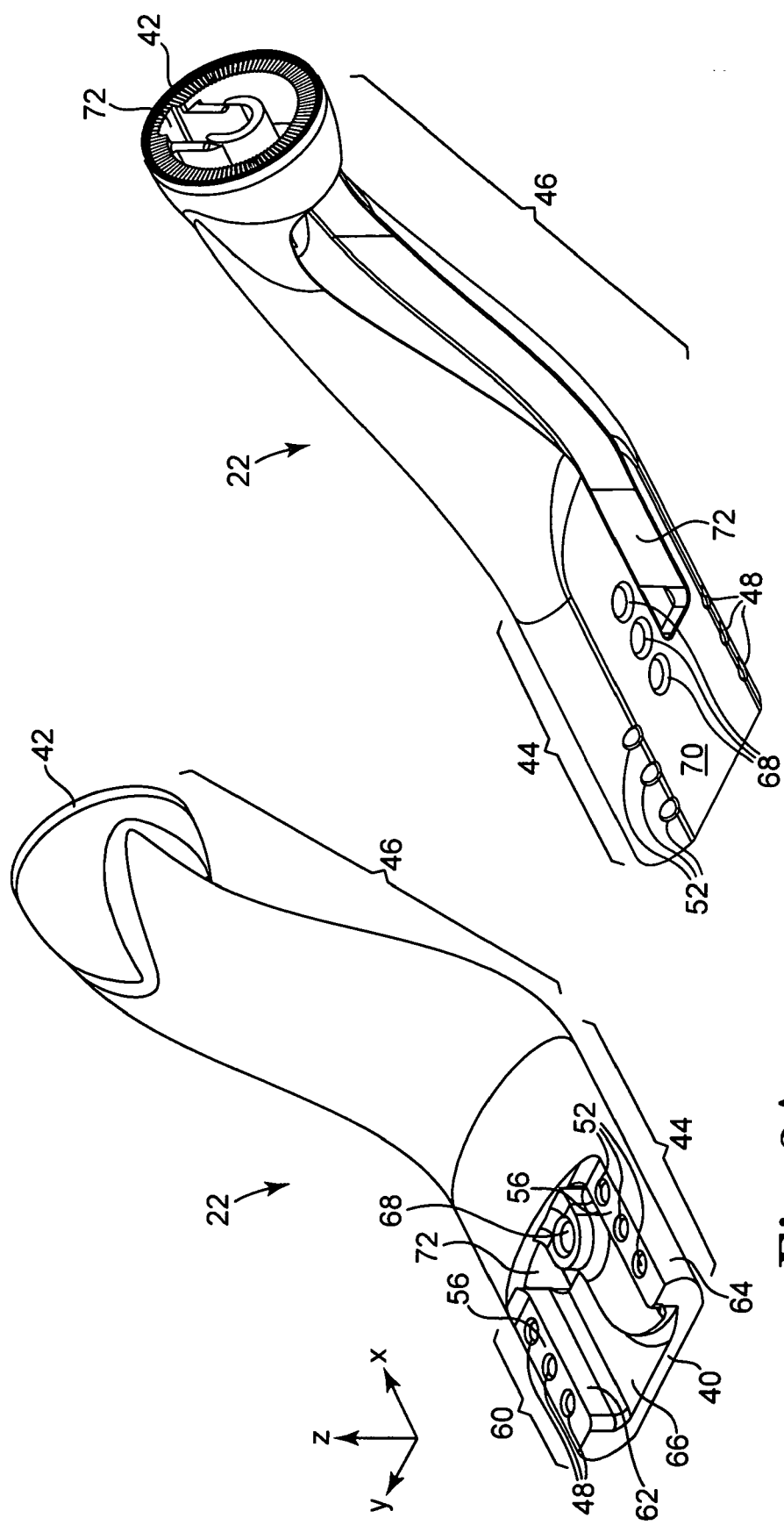

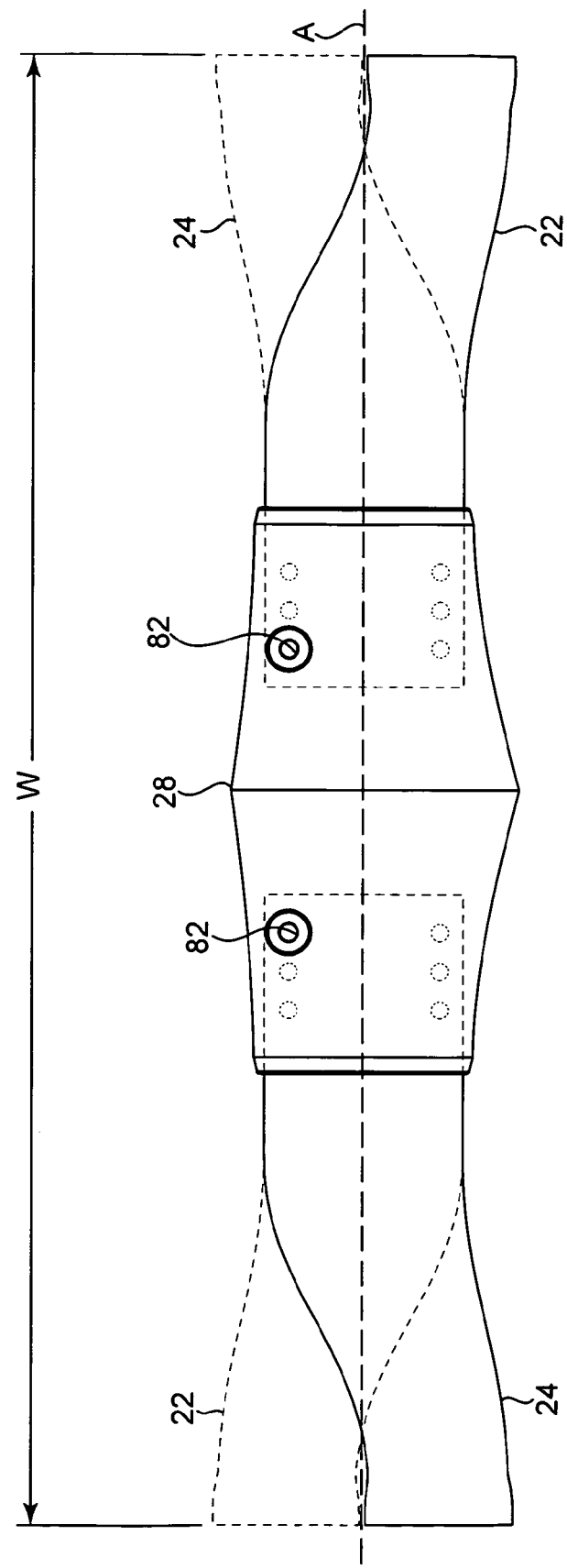

MOTORCYCLE ADJUSTABLE LIGHT BAR ASSEMBLY

BACKGROUND

The present invention generally relates to custom accessories for a motorcycle, and more particularly, to a light bar accessory for a motorcycle. Stock motorcycle lighting may comprise basic lighting components, such as a headlight, a brake light and front and rear turn signal lights. FIG. 1 is a partial front perspective view of a motorcycle 10. As shown in FIG. 1, a common mounting location for a headlight 12 is on the front fork assembly 14. Various aftermarket lighting components are available for installation on motorcycles to improve the visibility, appearance and lighting function of the motorcycle. One known lighting component is a light bar, in which various lighting elements may be carried on a unitary bar mounted below the headlight. There continues to be a need for an aftermarket lighting accessory that can be easily adapted for mounting on several different makes and models of motorcycles.

SUMMARY OF THE INVENTION

The present invention is a motorcycle light bar assembly for mounting on a bracket that is secured to a structural component of a motorcycle. The mounting bracket is configured to define first and second spaced mounting holes. The motorcycle light bar assembly comprises a first light bar arm that is configured for adjustable mounting to the one of the first and second mounting holes of the mounting bracket. The first light bar arm has a first end and a second end. A first arm portion of the first light bar arm extends from the first end in a first direction along an axis. A second arm portion of the first light bar arm is connected to and extends from the first arm portion to the second end. The second end of the first light bar arm is eccentric to the axis in a second direction that is generally normal to the first direction. The second end of the first light bar arm is configured for connection to a lighting component. The motorcycle light bar assembly further comprises a second light bar arm that is configured for adjustable mounting to one of the first and second mounting holes of the mounting bracket. The second light bar arm has a first end and a second end. A first arm portion of the second light bar arm extends from the first end in a third direction, opposite the first direction, along an axis. A second arm portion is connected to and extends from the first arm portion to the second end. The second end of the second light bar arm is eccentric to the axis in the second direction generally normal to the third direction. The second end of the second light bar arm is configured for connection to a lighting component. The first arm portions of the first and second light bar arms are partially surrounded by a cover having a first end, a second end, an inner surface, an outer surface and a cover wall defined between the inner and outer surfaces. The first end of the cover is configured to at least partially surround the first arm portion of one of the first and second light bar arms. The second end of the cover configured to at least partially surround the first arm portion of one of the first and second light bar arms. The cover wall is configured to at least partially surround the first arm portions of the first and second light bar arms and a front portion of the mounting bracket. The cover wall is further configured for connection to first and second light bar arms. The first and second light bar arms are mountable in a first configuration with the first light bar arm mounted to the first mounting hole of the mounting bracket and the second light bar arm mounted to the second mounting hole of the mounting bracket. Alternatively, the first and second light bar arms are mountable in a second configuration with the first light bar arm mounted to the second mounting hole of the mounting bracket and second light bar arm mounted to the first mounting hole of the mounting bracket. A width of the motorcycle light bar assembly defined by the second ends of the first and second light bar arms is variable in either the first or second configuration.

BRIEF DESCRIPTION OF THE DRAWINGS

FIG. 3A is a top perspective view of the arm of FIG. 3.

FIG. 3B is a bottom perspective view of the arm of FIG. 3.

FIG. 6 is a top partial assembly view of the light bar accessory of the present invention.

DETAILED DESCRIPTION

Figure 2:
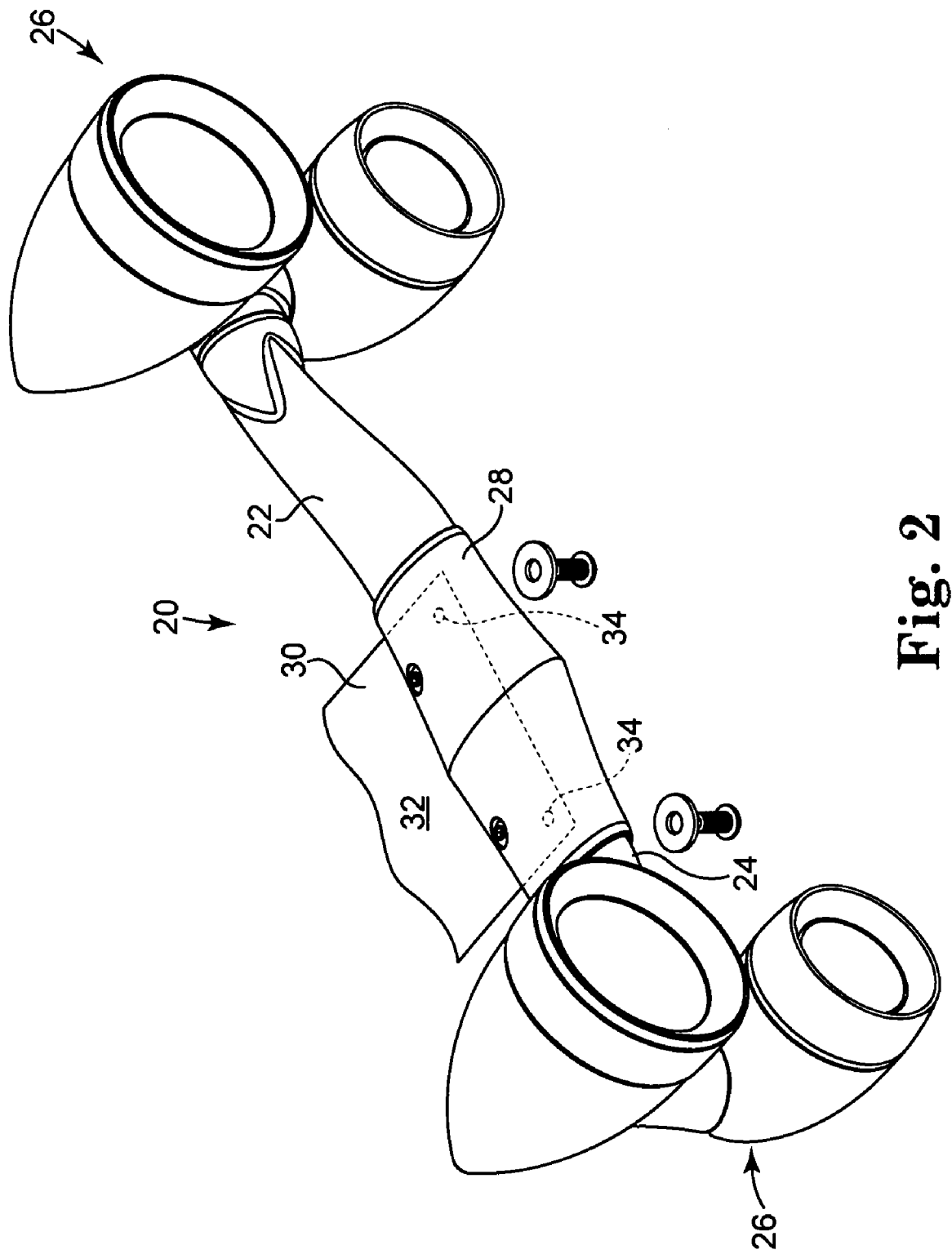
FIG. 2 is a front perspective view of a light bar accessory of the present invention.

FIG. 2 is a front perspective view of a light bar accessory 20 of the present invention. As shown in FIG. 2, light bar accessory 20 generally comprises a first light bar arm 22, a second light bar arm 24, one or more lighting components 26 mounted at an outer end of each of the light bar arms 22 and 24, and a central cover 28 that mounts over an inner end of each of the light bar arms 22 and 24. Light bar accessory 20 mounts to a mounting bracket 30 that is configured to mount to a structural component of a front fork assembly of a motorcycle, e.g., a triple tree, a cross-brace, etc. Various mounting brackets suitable for mounting light bar accessory 20 include part numbers 4002, 4003, 4004, 4005, 4006, 4007, 4008 and 4009 sold by Kuryakyn Holdings, Inc. of Somerset, Wis. Mounting bracket 30 includes a planar base 32 with a pair of spaced mounting holes 34, which align with mounting holes in light bar arms 22 and 24 as will be more fully described herein.

Figure 3:
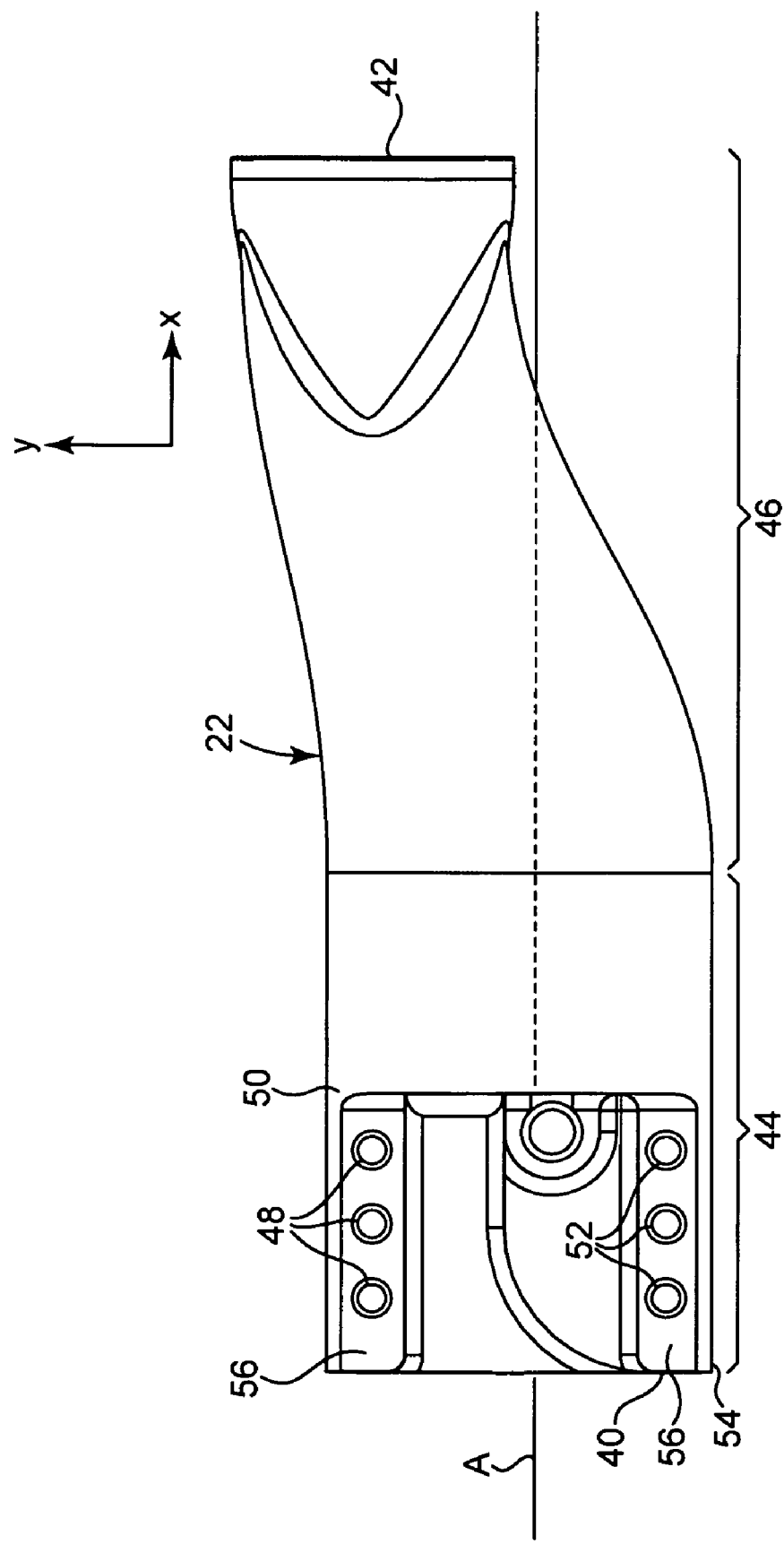
FIG. 3 is a top view of an arm of the light bar accessory of FIG. 2.

FIG. 3 is a top view of first light bar arm 22, light bar arm 24 being a mirror image of light bar arm 22. Light bar arm 22 comprises a first end 40, a second end 42, a first arm portion 44 which extends from the first end 40, and a second arm portion 46, which is connects to first arm portion 44 and extends toward second end 42. In one embodiment, first arm portion 44 and second arm portion 46 are integrally connected. First arm portion 44 is configured to define a first set of equally longitudinally spaced through-holes 48 along and adjacent to a first side 50 of light bar arm 22, and a second set of equally longitudinally spaced through-holes 52 along and adjacent to second side 54 of light bar arm 22. Through-holes 48 and 52 are linearly arranged to be generally parallel to a central longitudinal axis A of the first arm portion 44. Holes 48 and 52 are configured with internal threads and extend downward from an upper surface 56 of the first arm portion 44. In one embodiment, the first and second sets of through-holes 48 and 52 comprise three holes.

As further shown in FIG. 3, relative to X and Y directions, the second arm portion 46 curves at an angle relative to axis A (which extends in the X direction) such that the second end 42 is eccentric to axis A (in the Y direction). Second end 42 is configured to define a mateable surface for connecting to a complimentary mating surface on the one or more lighting components 26.

Figure 1:
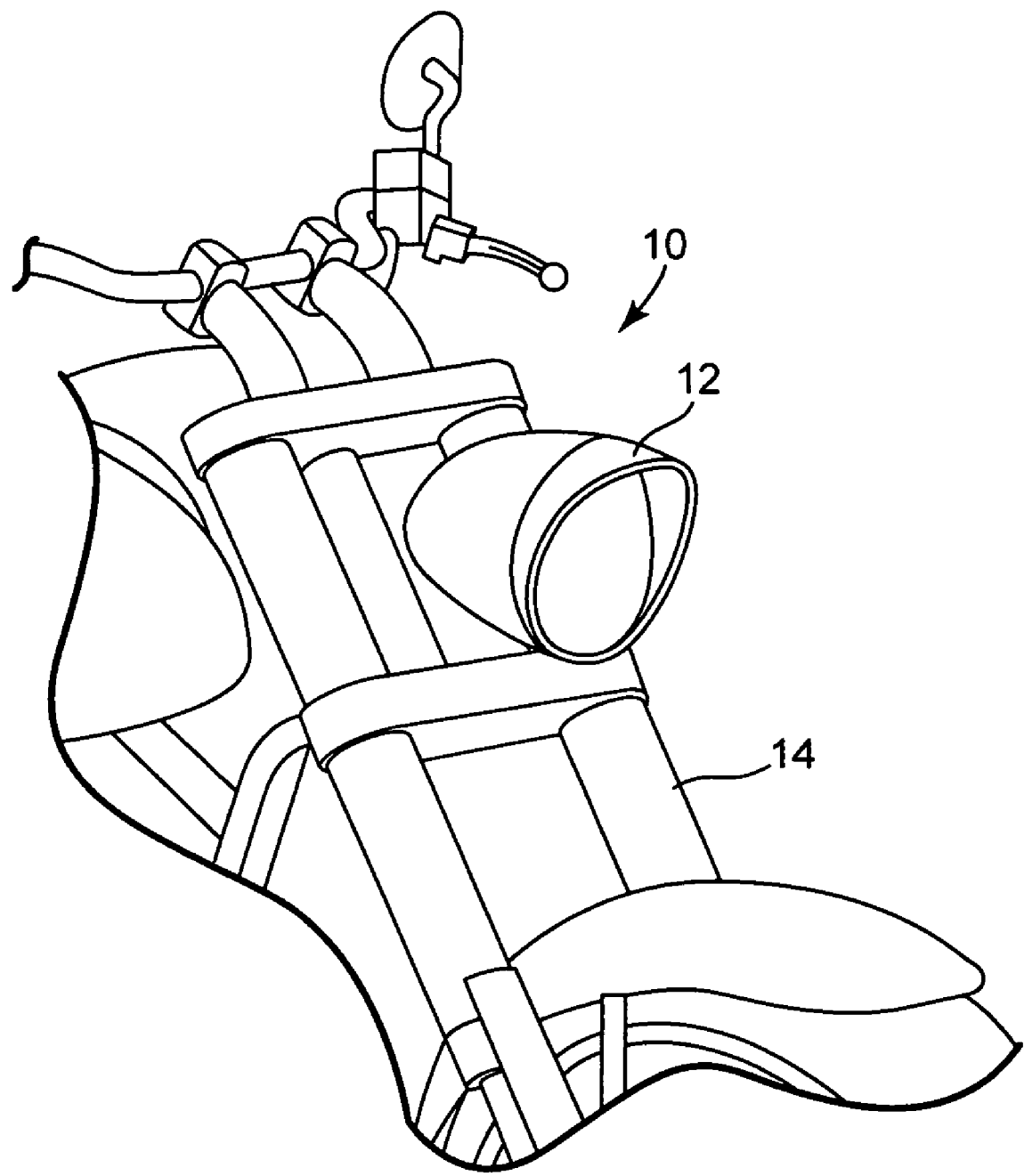
FIG. 1 is a partial front perspective view of a motorcycle.

FIG. 3A is a top perspective view of light bar arm 22, which more clearly shows that in one embodiment, second arm portion 46 also extends at an angle in the Z direction relative to first arm portion 44 such that second end 42 is elevated relative to first end 40. As further shown in FIG. 3A, adjacent to first end 40 the first arm portion 44 includes a U-shaped wall portion 60 which comprises legs 62 and 64 and a base 66. Holes 48 and 52 are located in legs 62 and 64, respectively. The upper surface 56 of legs 62 and 64 are generally co-planar. A portion of base 66 is configured with additional wall thickness to define a mounting hole 68 spaced from first end 40. As shown in FIG. 3B, additional mounting holes 68 are configured in the lower surface 70 of the first arm portion 44. Holes 68 are equally longitudinally spaced and arranged to be generally parallel to holes 48 and 52. In one embodiment, holes 68 are generally positioned between legs 62 and 64, and more specifically may be positioned generally along axis A (FIG. 3). Mounting holes 68 extend from the lower surface 70 into the first arm portion 44 and are configured with internal threads which enables mounting of the first light bar arm 22 to the mounting bracket 30 (FIG. 1).

As further shown in FIG. 3B, the lower surface 70 of first arm portion 44 and second arm portion 46 is configured to define a cavity 72 that extends from the U-shaped wall portion 60 (FIG. 3A) to the second end 42. Cavity 72 provides a recessed area of light bar arm 22 for routing and locating electrical wires that connect the lighting components 26 to a power source. In that light bar arm 24 is a mirror image of light bar arm 22, the features of light bar arm 22 described above apply as well to light bar arm 24. Light bar arms 22 and 24 are made from a sturdy, light-weight metal material. In one embodiment, light bar arms 22 and 24 are formed from aluminum in a die cast process and all external surfaces are chrome plated.

Figure 4:
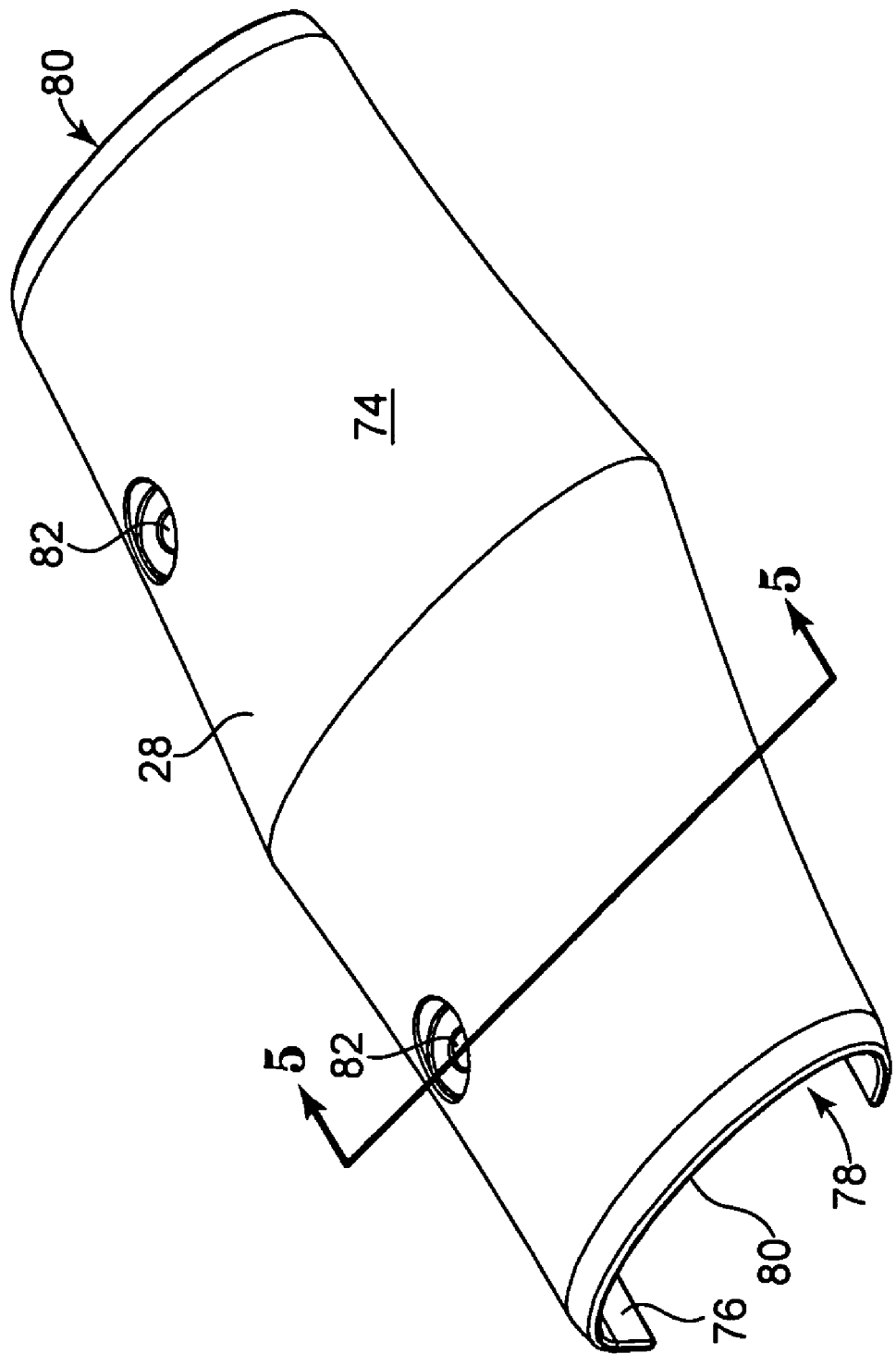
FIG. 4 is a front perspective view of a cover of the light bar accessory of FIG. 2.

FIG. 4 is a front perspective view of the central cover 28 which is configured to fit over the respective first arm portions 44 of light bar arms 22 and 24 to hide the connection of arms 22 and 24 to mounting bracket 30. Cover 28 generally comprises an inverted, U-shaped metal shell that has an outer surface 74, an inner surface 76, which defines an internal cavity 78, and open ends 80 for receiving the respective first arm portions 44 of light bar arms 22 and 24 into the cavity 78. Open ends 80 generally are configured to fit complimentary with the shape of the first arm portions 44. The metal shell defining cover 28 is configured with a pair of spaced through-holes 82 that are recessed relative to the outer surface 74 for connecting cover 28 to light bar arms 22 and 24. In one embodiment, cover 28 is made from aluminum in a die cast process and is chrome plated.

Figure 5:
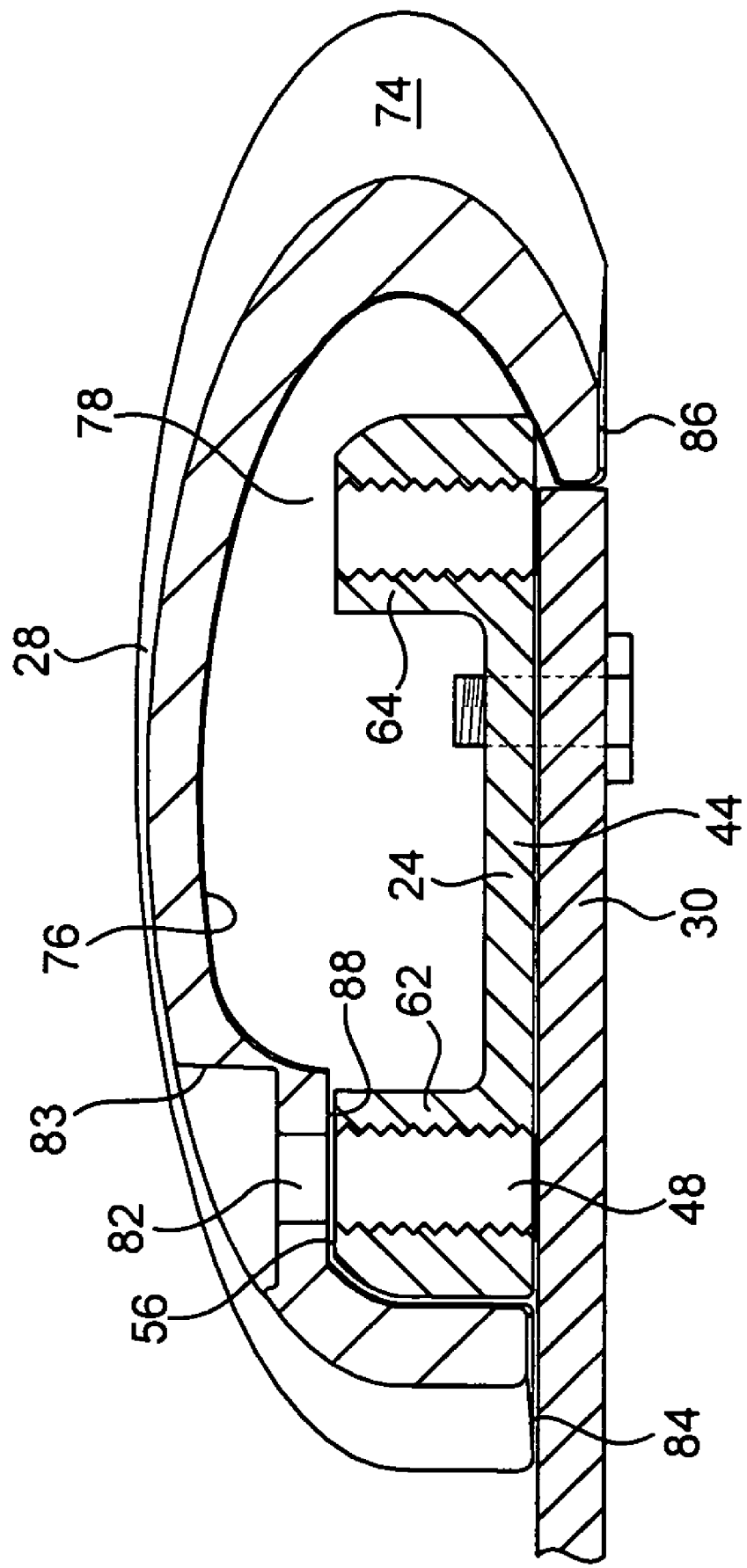
FIG. 5 is a cross-sectional view of the cover of FIG. 4 taken along line 5-5.

FIG. 5 is a diagrammatic cross-sectional view of cover 28 with the first arm portion 44 of light bar arm 24 positioned within the cavity 78. As shown in FIG. 5, cover 28 comprises a rear lower edge 84 and a front lower edge 86. Lower edges 84 and 86 are offset, i.e., such that they lie in different, spaced planes. This configuration allows the front lower edge 86 to cover the front end of mounting bracket 30 while the rear lower edge 84 is above the upper surface of mounting bracket 30. Light bar arm 24 rests on the mounting bracket 30 and is secured thereto by passing a threaded connector through the mounting hole 34 of the mounting bracket 30 and threading the connector into one of the threaded mounting holes 68 in the light bar arm 24. The interior surface 76 of the cover 28 is configured with a complimentary planar surface 88 adjacent to the through-hole 82 that mates with the upper planar surface 56 of one of the legs of light bar arm 24, e.g., leg 62. Mounting holes 68 are spaced such that when one of mounting holes 68 is aligned with the mounting hole 34 of mounting bracket 30, one of through-holes 48 aligns with through-hole 82 in cover 28. Cover 28 is secured to light bar arms 22 and 24 by passing a threaded connector, e.g. a bolt, through each hole 82 and threading it into a respective one of holes 48 of light bar arms 22 and 24. Relative to each hole 82, cover 28 may further include a widened recessed cavity 83 adjacent to the outer surface 74 to allow the head of the threaded connector to be recessed relative to the outer surface 74.

FIG. 6 is a top view of light bar arms 22 and 24 positioned within cover 28. As shown in FIG. 6, holes 82 of cover 28 are oriented in a position that would be closer to the front fork assembly 14 of a motorcycle (FIG. 1). As shown in FIG. 6, light bar arms 22 and 24 can be mounted in two configurations. In a first configuration, light bar arms 22 and 24 are shown in solid lines with the second arm portions 46 positioned forward of the center axis A. Such a configuration is desirable if, for example, adequate clearance between the lighting components 26 of the light bar accessory 20 and structures at the front end of the motorcycle (e.g., a motorcycle windshield) is necessary.

A second configuration of light bar arms 22 and 24 is shown in broken lines. In this second configuration, the position of light bar arms 22 and 24 within cover 28 is reversed. The second configuration allows the second arm portions 46 to be positioned to the rear of the center axis A, which allows the lighting components 26 to be located closer to the front fork assembly 14 of the motorcycle. Light bar arms 22 and 24 are also adjustable within cover 28 to vary the overall width W of light bar accessory 20. As shown in FIG. 6, light bar arms 22 and 24 are mounted at a maximum width. The spacing of holes 48 and 52 are coordinated with the spacing of holes 68 (FIG. 3B) so that the width of arms 22 and 24 can be reduced and one of holes 48 or 52 will align with hole 82 of cover 28 and one of holes 68 will correspondingly align with hole 34 of mounting bracket 30. The adjustability of the width of light bar accessory 20 enables it to be mounted on various models of motorcycles having differing front end components and component shapes and yet be adapted to provide a spacing and location of the light bar lighting components 26 that is the most functional and most appealing visually.

Although specific embodiments have been illustrated and described herein, it will be appreciated by those of ordinary skill in the art that a variety of alternate and/or equivalent implementations of the present invention may be substituted for the specific embodiments shown and described without departing from the scope of the present invention. Therefore, it is intended that this invention be limited only by the claims and the equivalents thereof.

What is claimed is:

1. A motorcycle light bar assembly for mounting on a bracket secured to a structural component of a motorcycle, the mourning bracket configured to define first and second spaced mounting holes on opposite sides of the mounting bracket, the motorcycle light bar assembly comprising:

a first light bar arm configured for adjustable mounting to the one of the first and second mounting holes of the mounting bracket, the first light bar arm having a first end, a second end, a first arm portion extending from the first end in a first direction along an axis, a second arm portion connected to and extending from the first arm portion to the second end, the second arm portion curving in a second direction such that the second end is eccentric to the axis, the second end configured for connection to a lighting component;

a second light bar arm configured for adjustable mounting to one of the first and second mounting holes of the mounting bracket, the second light bar arm having a first end, a second end, a first arm portion extending from the first end in a third direction opposite the first direction along an axis, a second arm portion connected to and extending from the first arm portion to the second end, the second arm portion curving in the second direction such that the second end is eccentric to the axis, the second end configured for connection to a lighting component;

a cover having a first end, a second end, an inner surface, an outer surface and a cover wall defined between the inner and outer surfaces, the first end of the cover configured to at least partially surround the first arm portion of one of the first and second light bar arms, the second end of the cover configured to at least partially surround the first arm portion of one of the first and second light bar arms, the cover wall configured to at least partially surround the first arm portions of the first and second light bar arms and a front portion of the mounting bracket, the cover wall further configured for connection to first and second light bar arms; wherein the first and second light bar arms are mountable in a first configuration with the first light bar arm mounted to the first mounting hole of the mounting bracket and the second light bar arm mounted to the second mounting hole of the mounting bracket such that the second ends of the first and second light bar arms are forward of the axis, and wherein the first and second light bar arms are alternatively mountable in a second configuration with the first light bar arm mounted to the second mounting hole of the mounting bracket and the second light bar arm mounted to the first mounting hole of the mounting bracket such that the second ends of the first and second light bar arms are rearward of the axis, and wherein a width of the motorcycle light bar assembly defined by the second ends of the first and second light bar arms is variable in either the first or second configuration.

2. The motorcycle light bar assembly of claim 1 wherein the second arm portions of the first and second light bar arms further extend in a third direction relative to the respective first arm portions.

3. A motorcycle light bar for mounting on a planar surface of a mounting bracket having first and second mounting holes, the motorcycle light bar comprising:

a first light bar arm and a second light bar arm, each of the first and second light bar arms having a first end, a second end configured for connection to a lighting component, a first side, a second side, a first arm portion extending from the first end toward the second end along an axis in an X direction, and a second arm portion connected to and extending from the first arm portion to the second end, the second arm portion being angularly displaced from the first arm portion in a Y direction such that the second end of the first light bar arm is eccentric to the axis of the first arm portion, the first arm portion configured to define a first plurality of internally threaded holes adjacent to the first side, and a second plurality of internally threaded holes adjacent to the second side, the first and second plurality of holes being linearly arranged and generally parallel to the axis, the first and second plurality of holes extending from an upper planar surface of the first arm portion toward a lower surface of the first arm portion, the first arm portion further configured to define a third plurality of internally threaded holes generally along the axis, the third plurality of holes extending from a lower surface of the first arm portion and being positioned generally between the first and second plurality of threaded holes, each hole of the third plurality of holes configured to align with one of the first and second mounting holes of the mounting bracket, wherein the second light bar arm is a mirror image of the first light bar arm; and a cover having a first end, a second end, an inner surface and an outer surface, a cover wall defined between the inner and surfaces, the first end of the cover configured to partially closely surround the first arm portion of the first light bar arm, the second end of the cover configured to partially closely surround the first arm portion of the second light bar arm, the cover wall configured with first and second openings that extend from the outer surface to the inner surface, wherein the first opening of the cover is configured to align with a first or second one of the first plurality of holes of the first light bar arm when a respective first or second one of the holes of the third plurality of holes of the first light bar arm is aligned with the first mounting hole of the mounting bracket, and wherein the second opening of the cover is configured to align with a first or second one of the first plurality of holes of the second light bar arm when a respective first or second one of the third plurality of holes of the second light bar arm is aligned with the second mounting hole of the mounting bracket.

4. The motorcycle light bar of claim 3 wherein second arm portions are further angularly displaced from the respective first arm portions in a Z direction.

* * * * *